United States Patent [19]

Brummett et al.

[11] 4,367,243
[45] Jan. 4, 1983

[54] METHOD FOR PREPARING COOKING PIZZA

[75] Inventors: Barry J. Brummett; Edward E. O'Neill, both of Wichita, Kans.

[73] Assignee: Pizza Hut, Inc., Wichita, Kans.

[21] Appl. No.: 203,703

[22] Filed: Nov. 3, 1980

[51] Int. Cl.³ .............................................. A21D 8/00
[52] U.S. Cl. .................................... 426/303; 426/307; 426/391; 426/505; 99/432; 99/DIG. 15
[58] Field of Search ............... 426/283, 293, 296, 302, 426/303, 307, 391, 505, 94, 138, 113, 124, 128; 99/DIG. 15, 432, 433, 450

[56] References Cited

U.S. PATENT DOCUMENTS

| 3,453,948 | 7/1969 | Murphy | 99/433 |
| 3,453,949 | 7/1969 | Levin | 99/446 |
| 4,176,591 | 12/1979 | Power | 99/DIG. 15 |
| 4,260,060 | 4/1981 | Faller | 426/113 |
| 4,271,200 | 6/1981 | Hempeninus | 426/293 |

OTHER PUBLICATIONS

The Family Circle, vol. 10, Rockville House Pub. Inc., N.Y. 1972, p. 1196.

Primary Examiner—Raymond N. Jones
Assistant Examiner—Elizabeth A. Hatcher
Attorney, Agent, or Firm—Hume, Clement, Brinks, Willian & Olds, Ltd.

[57] ABSTRACT

Improved apparatus and methods for assembling and cooking pizza are disclosed which markedly reduce the final cooking time required. Preferably, a pizza shell is precooked in an enclosed container which confines and controls the shape of the shell as well as the moisture loss by the shell during precooking. In addition, a high solids, preheated sauce and a high fat, thin sliced cheese are used to accelerate the final cooking process. Cooking is preferably performed in a perforated cooking pan having a plurality of raised support surfaces. A forced air oven is preferably used for cooking, and the raised support areas and the perforations of the pan cooperate to maximize contact between the heated air and the underside of the pizza. In combination, these techniques significantly reduce required cooking time for pizza.

19 Claims, 9 Drawing Figures

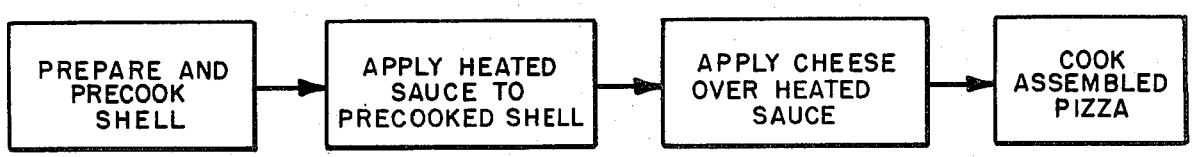
FIG. 1
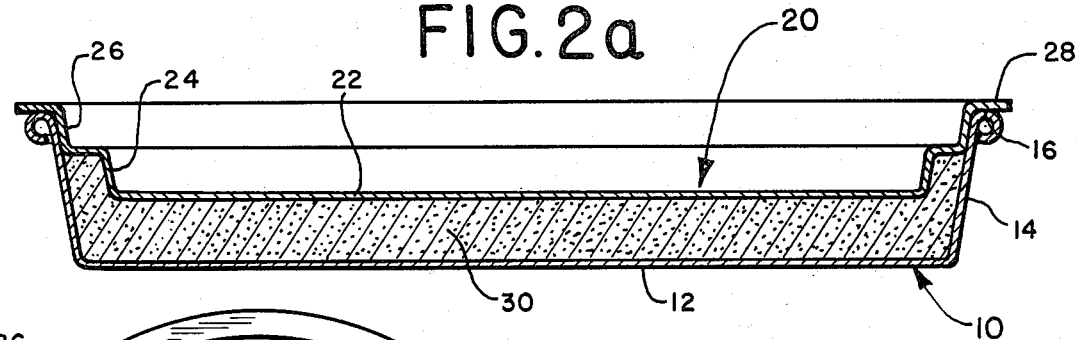
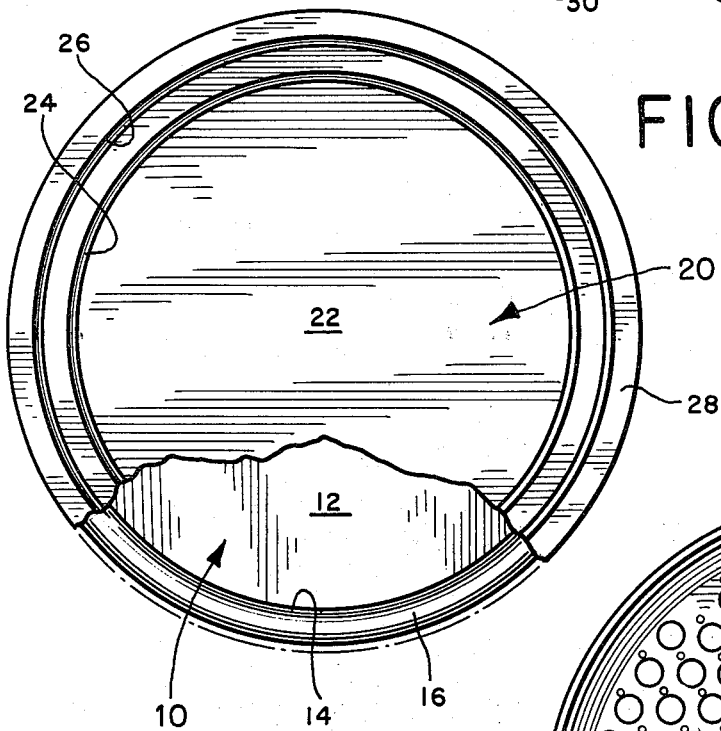
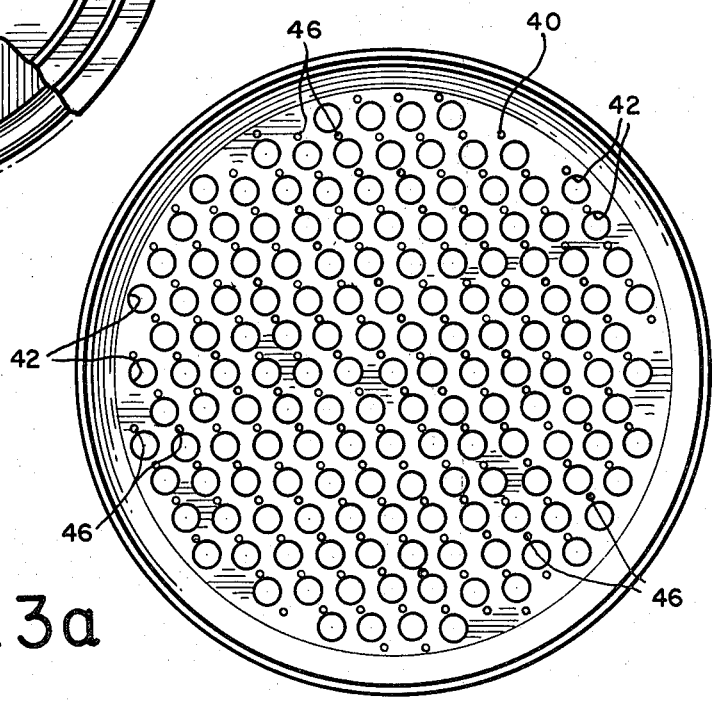

METHOD FOR PREPARING COOKING PIZZA

BACKGROUND OF THE INVENTION

The present invention relates generally to apparatus and methods for preparing and cooking pizza, and in particular to improvements in such apparatus and methods which permit important reductions in the cooking time required to properly cook pizza.

Pizza is commonly perceived as a fast food, and customers of pizza restaurants often expect prompt service typical of other fast food restaurants. In fact, conventional cooking methods result in a cooking time for thick crust pizza which can often exceed twenty minutes. In the past, the disparity between the image of pizza as a fast food and the reality of twenty minute or longer cooking times has created inevitable dissatisfaction among the consuming public.

Furthermore, conventional pizza cooking procedures can require customers to wait for extended periods after they have been seated. Particularly in the case of thick crust pizza, which can require twenty to thirty minutes for proper cooking, pizza cooking time acts as a limit on the table turnover rate and therefore as a limit on the peak capacity of pizza restaurants.

A need therefore exists for improved techniques for preparing and cooking pizza which is comparable to present pizza in terms of taste, texture and other such characteristics, yet which can be cooked more quickly to reduce customer waiting time and dissatisfaction and to increase restaurant serving capacity.

SUMMARY OF THE INVENTION

The present invention is directed to improved methods and apparatus for significantly reducing the cooking time require to properly cook pizza. The techniques and structures described in the following specification can be used to cook thick crust pizza properly in less than five minutes and to cook thin crust pizza even more quickly.

A number of innovations and novel procedures have been combined to achieve the goal of reduced cooking time for pizza. The following description will describe each of these aspects of the invention in detail. However, it should be understood that it is not necessary to use all of the procedures described below in combination to achieve significant reduction in required cooking times.

According to a first aspect of the invention, the assembled pizza is cooked in a cooking pan which has a lower surface which defines a plurality of openings therein. Preferably, this lower surface of the cooking pan is provided with a large number of raised support surfaces, such as dimples in the lower surface, for example. These raised support surfaces act to support the assembled pizza above the lower surface of the cooking pan, and thereby to facilitate the flow of heated gases towards the underside of the assembled pizza, as well as the flow of steam and other vapors away from the underside of the assembled pizza. Preferably, final cooking is performed in an oven which includes means for directing heated air against the underside of the cooking pan. When such an oven is used, the heated air is passed by the openings in the pan directly to the underside of the assembled pizza. Because the pizza is supported on the raised support surfaces, substantially all of the underside of the assembled pizza can be reached by the heated air. This combination of the novel cooking pan described above and forced air ovens has been found to reduce the required cooking time significantly.

According to a second aspect of the invention, an improved, preheated pizza sauce is used to reduce required cooking time. This cooking sauce is a relatively thick sauce having a total natural tomato soluble solids content in the preferred range of 10–14% by weight. Furthermore, the tomato sauce is preheated, preferably to a temperature in excess of 145° F. By using a relatively thick tomato sauce, the water content of the sauce is reduced, thereby reducing the total heat capacity of the sauce and increasing the rate at which it can be heated during the cooking process. In addition, by using a preheated sauce in pizza assembly, the extent to which the sauce temperature must be raised during the cooking process is reduced, thereby further accelerating the cooking process.

According to a third aspect of the invention, a pizza shell is precooked in order to reduce final cooking time. Preferably, such precooking is performed in an enclosed precooking pan. This precooking pan defines an internal volume which in turn defines the shape of the precooked shell. The pan includes a lid which defines a peripheral circumferential ridge. By precooking the pizza shell in a precooking pan of the type described below, the shell is formed into a predetermined shape which is adapted to support the other components of a pizza. This predetermined shape includes flattened, parallel upper and lower surfaces and an upper circumferential ridge surrounding the upper surface. As will be explained in greater detail below, the use of an enclosed precooking pan permits improved control over the moisture content and uniformity in terms of size, shape, and density, as well as texture and browning. It has been found that by precooking the pizza shell, particularly thick shells, the cooking time required for the assembled pizza can be significantly reduced. In the following description and claims, the term "shell" will be used to denote the lower crust/dough layer of a pizza, whether cooked or uncooked.

According to a fourth aspect of the invention, yet another component of the pizza, the cheese in this case, is modified further to reduce the required cooking time. It has been found that sliced strips of cheese having a thickness in the preferred range of ⅛ inch to 3/16 of an inch and a fat content in the preferred range of 40–50% on a dry weight basis are particularly preferred. Cheese strips of the type and shape described above provide the important advantages that on the one hand they are thick enough to allow freezing and convenient storage and transport without undesired aggregation, yet on the other hand are thin enough to melt and brown quickly during the cooking process. This particular size allows for portion control in terms of using volume cups. Thus, cheese of the type described above also contributes to reduction in the required pizza cooking time.

As mentioned above, it has been found advantageous to use each of the four aspects of the invention described above in combination in order to minimize cooking time of thick crust pizza. However, it is possible to obtain significant reductions in cooking time of both thin and thick crust pizza without employing all four aspects of the invention. For example, thin crust pizza can be cooked quickly without precooking the pizza shell, and significant reductions in the required cooking time for thick crust pizza can be achieved merely by using the improved preheated sauce and novel cooking techniques described below.

The present invention, together with further objects and attendant advantages, will best be understood by reference to the following detailed description taken in connection with the accompanying drawings.

BRIEF DESCRIPTION OF THE DRAWINGS

FIG. 1 is a block diagram of the presently preferred embodiment of the method of this invention for preparing and cooking thick crust pizza.

FIGS. 2a and 2b are drawings of a preferred embodiment of the pizza crust precooking pan and lid of this invention.

FIGS. 3a, 3b and 3c are drawings of a first preferred embodiment of the improved pizza cooking pan of this invention.

DETAILED DESCRIPTION OF THE PRESENTLY PREFERRED EMBODIMENTS

Figure 3B:
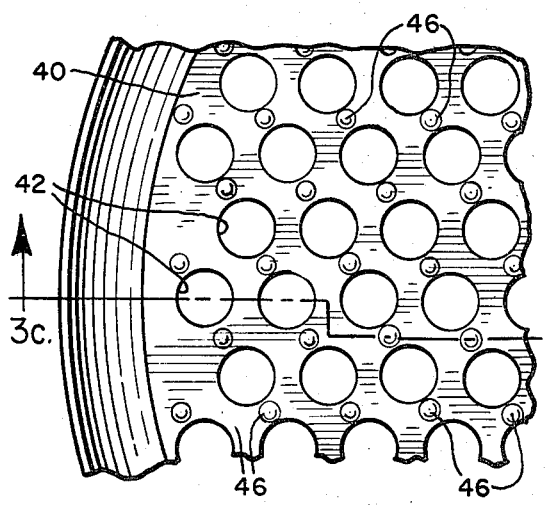

Referring now to the drawings, the presently preferred embodiments of the apparatus and method of this invention for cooking thick crust pizza will be described in connection with FIG. 1. Following this description, alternative embodiments of the invention will be described for the preparation of thin crust pizza and for the preparation of thick crust pizza in other cooking ovens.

As shown in FIG. 1, the first step in the improved method of this invention is to prepare and precook the pizza shell. In this preferred embodiment, a light, open textured pan pizza dough is used. The following description will assume that the finished diameter of the pizza is nine inches. Of course, it should be understood that the same techniques can be used to assemble and cook pizzas of other dimensions.

The first step in preparing the pizza shell is to provide a selected quantity of about $8\frac{3}{4}$ ounces of pizza dough. The amount of dough can vary within the preferred range of 8 ounces to $9\frac{1}{2}$ ounces; however, uniformity of the finished pizza requires control over the initial quantity of pizza dough. The selected quantity of dough is first passed through a dough sheeter and then placed in the bottom of a nine inch precooking pan. Prior to placing the dough in the precooking pan, about $\frac{7}{8}$ ounces of cooking oil is placed in the bottom of the pan. The dough is then allowed to proof or rise to a height of $\frac{3}{4}$ inch to 1 inch in the precooking pan which have been covered to reduce drying. At ambient temperatures this generally requires about 1 to $1\frac{1}{2}$ hours of rising.

After the uncooked dough has proofed, a lid is then placed over the pan to reduce the volume and to define the shape of the proofed dough. FIGS. 2a and 2b depict a preferred embodiment of the precooking pan 10 and the lid 20. As shown in FIG. 2a, the pan 10 is provided with a flattened lower surface 12 and a peripheral lid 14. In this preferred embodiment, the pan 10 is round, and the peripheral lip 14 is provided with an upper edge 16. The lid 20 is provided with a central flattened surface 22 and defines a peripheral raised ridge section 24 which surrounds the flattened surface 22. In addition, the lid 20 defines a circular sealing surface 26 sized to fit within and seal against the peripheral lip 14 of the precooking pan 10 and as a centering mechanism for the lid. This sealing surface 26 is provided with a flange 28 positioned to rest on the upper edge 16 of the lip 14. FIG. 2b shows a top view of the lid 20 showing the concentric arrangement of the flange 28, the sealing surface 26 and the ridge section 24.

When the lid 20 is placed within the precooking pan 10 as shown in FIG. 2a, the lid 20 and the pan 10 cooperate to define an internal volume 30 which is substantially sealed. This internal volume 30 includes a central section approximately $\frac{5}{8}$ inch in thickness (measured between the lower surface of the lid 20 and the internal surface of the lower surface 12 of the pan 10). In addition, the internal volume 30 includes a raised peripheral ridge 32 which extends uniformly around the periphery of the upper surface of the internal volume 30. Preferably, the fit between the sealing surface 26 and the lip 14 is close enough substantially to prevent the escape of dough out of the interior volume 30 during cooking.

When the lid 20 is installed in place over the proofed dough in the interior volume 30 and then pressed down until the flange 28 contacts the upper edge 16 of the lip 14, gases are forced out of the dough. The flange 28 serves as a stop surface to define the maximum extent to which the lid 20 fits within the pan 10, and therefore the size of the internal volume 30. In this way the density and average gas content of the dough is controlled, and the dough is made substantially to fill the interior volume 30. In addition, by confining the dough between the lid 20 and the pan 10 the shape of the precooked crust is defined and a peripheral ridge is formed around the upper edge of the dough.

The dough is then cooked while confined between the lid 20 and the pan 10. Preferably cooking is done at a temperature of 470° F. for a cooking period of about $3\frac{1}{2}$ minutes in a forced air oven.

In this preferred embodiment, the oven is a forced air oven marketed by Enersyst Energy Systems, 2051 Valley View Lane, Dallas, Texas as Model No. FS-6.1-4/4 Jet Sweep Oven. This is a conveyor oven which includes nine sets of heated air jets which direct air down onto the item being cooked and nine sets of air jets which direct heated air up against the underside of the item being cooked. Each set of air jets comprises two staggered rows of jets. In order to obtain optimum results it has been found preferable to close the two sets of jets at the top and the two sets of jets at the bottom at the exit end of the conveyor oven. Satisfactory results for precooking the pizza shell have been obtained with cooking periods in the preferred range of two to six minutes and at air temperatures in the preferred range of 400° F.–600° F.

By precooking pizza shell in this manner, moisture content and browning of the precooked shell can be carefully controlled. The lid 20 prevents the escape of excessive moisture or excessive browning of the pizza shell. Preferably the weight of the precooked pizza shell is substantially equal to the weight of the initial quantity of pizza dough. That is, the oil absorbed by the pizza dough in the precooking procedure is substantially equal in weight to the water driven out of the dough during the precooking process. The weight of the lid 20 should be adequate to maintain the lid 20 in the fully inserted position shown in FIG. 2a throughout the precooking procedure. In this preferred embodiment the lid and the pan are both made of type 3004-0 aluminum alloy in a thickness of 0.072 inches. Preferably both the lid 20 and the pan 10 are anodized to provide improved wear and cleaning characteristics. In effect, the dough is fried in the oil contained in the pan 10 to produce a crisp open textured, light crust with good flavor and texture characteristics.

After the shell has been precooked it is then cooled to set the structure of the shell. After an initial period of air cooling, the shell can be frozen or refrigerated to retard mold growth prior to use.

Precooking the pizza shell provides several significant advantages. First, by precooking the shell water is removed from the pizza dough, thereby reducing the final cooking time required after the pizza has been assembled. Furthermore, since the dough is precooked in a defined volume, the precooked shell provides excellent uniformity in terms of size, shape, and density, as well as texture and browning. As mentioned above, the use of a confined, covered precooking pan provides excellent control over moisture loss and browning of the precooked shell.

Returning now to FIG. 1, the second step in the improved method of this invention is to apply a heated tomato sauce to the precooked shell. This tomato sauce is preferably a spiced tomato sauce which is thicker than that often used in the industry. Preferably, the natural tomato soluble solids of this sauce are in the preferred range of 10–14%. Most preferably, the natural tomato soluble solids of the sauce is 11.1%. Preferably about 3½ ounces of sauce are spread evenly on the upper surface of the precooked shell. An acceptable range for the quantity of sauce is between 2½ and 4 ounces.

Preferably, the temperature of the heated sauce is in the range of 140° F.–200° F. The preferred temperature range is 145° F.–160° F., and the most preferred temperature for the heated sauce is 145° F. Temperatures above about 145° are important to retard bacterial growth in the heated sauce. On the other hand, high temperatures much in excess of 165° can result in carmelization of sugars in the sauce and can generally reduce the useful time at which the sauce can be maintained at the elevated temperature. These two competing considerations of bacterial growth on the one hand and temperature degradation of the sauce on the other hand should be balanced to determine an appropriate temperature for the heated sauce.

The use of a high solids, heated sauce brings important reductions in the required cooking time of the pizza. Because a high solids sauce is used, the total water content of the sauce is less than would otherwise be the case. This reduces the heat capacity of the sauce and speeds the cooking of the pizza. Furthermore, since the sauce is applied to the crust at an elevated temperature, less heating is required during the final cooking process to bring the sauce to proper temperature. Thus, both the composition and the temperature of the preheated sauce cooperate to reduce final cooking time.

As shown in FIG. 1, the third step in assembling the basic pizza is to apply a layer of chesse over the heated sauce. Preferably, this cheese is a mozzarella cheese having a water moisture content of between 45 and 51.5%. It has been found that high fat cheeses such as those made from whole milk provide improved melting characteristics, and preferably the fat content of this cheese on a dry basis ranges between 40 and 50%. In addition, the cheese is preferably applied in thin strips having a thickness of between 1/16 inch and 3/32 inch. Preferably these cheese strips have a length of between ¼ inch and ¾ inch and a width of between ⅛ inch and ¼ inch.

It has been found that cheese strips in the shape described above provide excellent storage characteristics in that the cheese can be frozen and refrigerated without the aggregation problems commonly encountered with shredded cheese. In addition, since the cheese is formed into thin strips, a relatively large surface area is presented to speed heating, melting and browning of the cheese during the final cooking process. Thus, both the high fat content and the shape of the cheese cooperate to reduce the required cooking time of the finished assembled pizza. This particular size allows for portion control through the use of predetermined volume cups.

In order to maximize uniformity of the finished pizza it is presently preferred to apply any toppings directly to the sauce before the cheese has been added. Conventional toppings can be used, and by covering the toppings with cheese, problems related to the burning of the edges of ham, green pepper or sausage are reduced. This can be especially important in connection with the high speed cooking procedures described below. Of course, it may be preferable in some situations to mix any toppings with the cheese, or even to apply the toppings over the cheese. In this preferred embodiment, up to seven ounces of cheese is applied to a nine inch pizza. After the cheese and any toppings have been applied, a small amount of a mixture of oregano, parmesan cheese and romano cheese is sprinkled on top of the pizza to improve flavor and appearance.

Figure 3C:
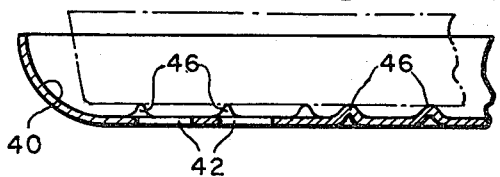

This completes the assembly of the pizza. The final step in the improved method of this invention is the actual final cooking of the assembled pizza. This cooking is preferably performed in an improved pizza cooking pan. FIGS. 3a–3c show a first preferred embodiment of the improved cooking pan of this invention.

As shown in FIG. 3a, the cooking pan 40 is a generally circular pan having a plurality of closely spaced openings 42 formed in the lower surface thereof. A solid rim section 44 completely surrounds the periphery of the pan 40. In this preferred embodiment, the pan 40 is a standard pizza cooking pan having an array of ½ inch diameter openings formed in the lower surface thereof. These openings are arranged in a closely packed pattern to minimize the amount of metal left in the central section of the pan 40. The openings 42 are formed in a regular array with about 11/16 inch between opening centers. FIG. 3b presents a detailed view illustrating the closely packed arrangement of the openings 42 in the pan 40. As shown in FIGS. 3b and 3c, an array of dimples 46 is formed in the pan 40 between the openings 42. Preferably, these dimples are about ⅛ inch in overall height. The precise spacing and arrangement of the dimples is not critical to the proper operation of the pan 40. However, it has been found that dimples separated by distance in the range of about ¾ inch to about 1¼ inch function properly. The purpose of the dimples 46 is to act as support surfaces which contact and hold the underside of the assembled pizza off of the pan 40. In this way, the contact area between the pan 40 and the underside of the assembled pizza is kept to a minimum.

Figure 4B:
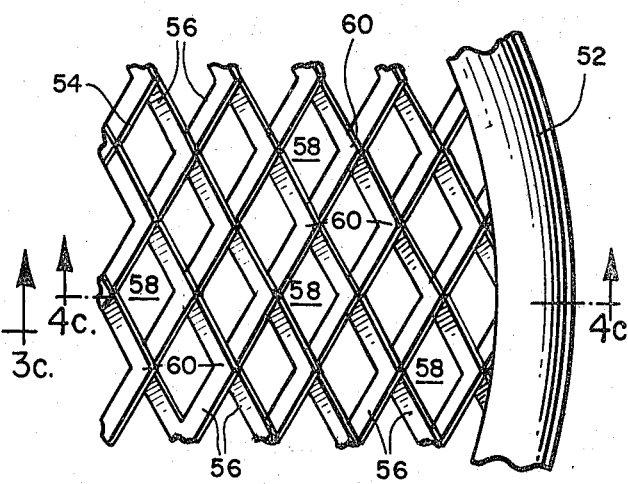
FIGS. 4a, 4b and 4c are drawings of a second preferred embodiment of the improved pizza cooking pan of this invention.
Figure 4C:
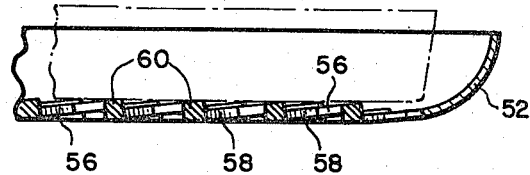
Figure 4A:
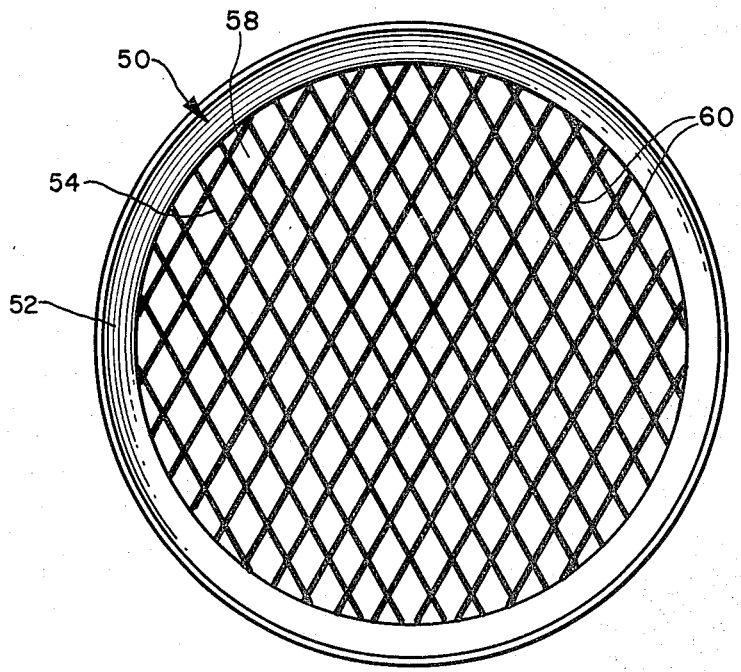

It should be understood that the exact size, shape and arrangement of the openings 42 can be altered significantly from the pattern shown in FIGS. 3a–3c. FIGS. 4a–4c illustrate a second preferred embodiment of a pan of this invention. This embodiment includes a pan 50 which defines an outer peripheral rim 52 and a central section formed of an expanded metal grid 54. This expanded metal grid 54 is made up of a plurality of metal strips 56 which are bonded together to form a substantially rigid structure. The openings 58 between the strips 56 serve a function analogous to the openings 42 of the first preferred embodiment. FIG. 4c shows a cross-sectional view in which it can be seen that the expanded metal grid 54 forms a plurality of raised support surfaces 60. These raised support surfaces 60 perform a function analogous to the dimples 46 of the first preferred embodiment. In both embodiments, the openings 42,58 serve to provide passageways through which heated air can pass to, and steam and other heated vapors can escape from, the underside of the assembled pizza. Similarly, the dimples 46 and the raised support surfaces 60 serve further to reduce the contact area between the underside of the assembled pizza and the pan, and therefore further to increase the proportion of the underside of the assembled pizza which can be reached by heated air directed through the openings 42,58.

Many other configurations are possible for the openings in the cooking pan. For example, cut-outs can be stamped in the underside of the cooking pan in a radial spoke pattern. In all cases, however, the size of the openings should not be so large as to allow the shell, whether precooked or not, to sag through the openings. In addition, the height and spacing of the support regions 46,60 should be adequate to support the major portion of the pizza above the pan during the cooking process. If the openings or number of openings are large enough fully to expose the underside of the pizza, discrete raised surfaces can even be eliminated in some embodiments.

The actual final cooking of the assembled pizza is accomplished by placing the assembled pizza, which is supported by a cooking pan such as the pan 40 of FIG. 3a or the pan 50 of FIG. 4a, in an oven. Preferably, the same oven is used for final cooking as that described above in connection with precooking of the pizza shell. As explained above, this preferred oven is a forced air oven which forces jets of hot air against both the underside and the top of the item being cooked. For the oven described above, it has been found that an air temperature of 570° F. and a cooking time of approximately 3½ minutes inside the cooking chamber of the oven are adequate to cook the assembled pizza properly. In practice, air temperature can range within the preferred temperature range of 500° F.–600° F. and cooking time can vary between 3¼ and 4 minutes inside the cooking chamber of the oven.

The novel cooking pan described above and the forced air oven cooperate to provide a particularly fast cooking of the assembled pizza. The combination of the holes and the raised support surfaces of the cooking pan allows heated air to contact the underside of the pizza directly. This speeds heat transfer from the heated air to the pizza as well as the escape of steam and other heated vapors from the underside of the pizza. This cooking process has been found to provide a crisp crust with good texture in very fast cooking times.

The foregoing description has been directed to a process for cooking a thick crust pizza. Many of the same techniques can be used to quickly cook a thin crust pizza as well. However, because thin crust pizza requires a smaller quantity of dough, it may not be necessary to precook the shell of a thin crust pizza.

When a thin crust pizza is assembled without precooking the shell, the pizza dough is preferably proofed in bulk for approximately four hours, then passed through a four roller dough sheeter, placed over the cooking pan, and cut to fit the pan. Preferably, about six ounces of dough are used for the crust of a nine inch pizza, and this dough is evenly distributed in a layer of constant thickness over the entire nine inch diameter of the cooking pan. Preferably, the dough is perforated in a regular pattern to reduce problems related to gas bubbles in the shell during cooking.

After a dough sheet has been placed in the cooking pan, sauce and cheese are applied in the same manner as that described above in connection with thick crust pizza. The cooking procedure is also identical to that described above, except the cooking time can be reduced to as little as two minutes. Thus, the improved, preheated sauce, the improved cheese, the improved cooking pan and the forced air oven contribute significantly to decrease required cooking time for thin crust pizza in much the same manner as that described above.

Furthermore, it should be understood that it is not necessary to use a forced air oven in all embodiments of the present invention. For example, a standard deck oven can be used to cook thick crust pizza using the same precooked shell, preheated sauce, and cheese as that described above. When these techniques are used in connection with a standard pizza cooking pan and a standard pizza deck oven, nine inch pizza has been found to cook in as little as eight minutes. This is a significant reduction as compared to the ten to twelve minute cooking period generally required for similar pizzas in the past. Similarly, a thirteen inch pizza has been found to cook in nine minutes, a time period which is significantly less than the twelve to fourteen minute period generally required for thirteen inch pizzas in the past.

From the foregoing, it should be apparent that an improved method and apparatus for assembling and cooking pizza has been described which significantly reduce the final cooking time required for both thick crust and thin crust pizza. Each of the improvements described above contributes to the markedly reduced cooking time achieved with the present invention. It should be understood that where maximum reduction in cooking time is not required, it may still be advantageous to use a subset of the foregoing apparatus and methods to reduce final cooking time.

The techniques described above can be used to reduce the final cooking time required for thick crust pizza to under five minutes. In this way customer waiting time can be significantly reduced, and customer satisfaction thereby increased. Using these techniques, pizza can truly be marketed as a fast food, and restaurant facilities can be better utilized.

Of course, it should be understood that various changes and modifications to the preferred embodiments described above will be apparent to those skilled in the art. The foregoing description of the preferred embodiments is intended to illustrate important features of the invention rather than to limit the scope of the invention, and it is intended that the following claims, including all equivalents, define the scope of this invention rather than the foregoing description.

We claim:

1. A method for preparing and cooking pizza comprising the following steps:
   providing a pizza shell;
   placing the shell in a cooking pan to provide an assembly;
   pre-heating a tomato sauce having a dissolved solids component greater than about 10% by weight to a temperature greater than about 145° F. in order to retard bacterial growth in said sauce but less than that which causes carmelization;

applying at least a portion of the pre-heated sauce to the shell; then applying at least one additional food component over the portion of pre-heated tomato sauce to complete the assembly of a pizza;

cooking the assembled pizza in a forced air oven which comprises means for directing heated air against the underside of the cooking pan and means for directing heated air against the upper side of the assembled pizza to accelerate the cooking of the assembled pizza;

the heat of said pre-heated tomato sauce acting to reduce the cooking time required properly to cook the assembled pizza.

2. The method of claim 1 wherein the temperature of the pre-heated sauce is in a range of about 145° F. to about 160° F.

3. The method of claim 1 wherein the temperature of the preheated sauce is about 145° F.

4. The method of claim 1 further comprising the step of placing the pizza shell in a cooking pan prior to the cooking step, wherein the pan is provided with a lower surface which defines a plurality of openings formed therein, said lower surface further defining a plurality of raised support regions which support at least a portion of the shell above the lower surface to reduce the area of contact between the shell and the lower surface; and wherein the cooking step comprises the step of placing the assembled pizza in a forced air oven which comprises means for directing heated air through the openings in the pan directly against the underside of the shell, and means for directing heated air against the upper surface of the assembled pizza to accelerate the cooking of the assembled pizza.

5. The method of claim 1 or 4 wherein the step of applying at least one additional food component comprises the step of applying a layer of cheese strips, each of said strips having a thickness in a range of about 1/16 inch to about 3/32 inch and comprising a cheese having a fat content on a dry basis between about 40% and about 50%.

6. The method of claim 1 or 4 further comprising the step of precooking the shell prior to applying the tomato sauce in order further to reduce the cooking time required properly to cook the pizza.

7. The method of claim 6 wherein the step of precooking the shell comprises the following steps:

placing the shell in a precook pan; then covering the precook pan with an imperforate cover to both reduce and control the volume and to form the shape of the shell; and then cooking the shell in the covered precook pan.

8. The method of claim 7 wherein the cover is shaped to form a raised circumferential rim on the upper surface of the shell.

9. A method for cooking pizza comprising the following steps:

providing an assembled pizza in a cooking pan, said pan having a lower surface which defines a plurality of openings formed therein, said lower surface further defining a plurality of raised support regions which support at least a portion of the underside of the assembled pizza above the lower surface to reduce the area of contact between the lower surface and the underside of the assembled pizza; then placing the assembled pizza and the cooking pan in a forced air oven which comprises means for directing a flow of heated air against the underside of the assembled pizza, said openings and raised support areas cooperating to expose the underside of the assembled pizza to the flow of heated air; and then cooking the assembled pizza in the oven;

said cooking pan acting to promote rapid heating of, and rapid evaporation of water from, the pizza, thereby reducing the cooking time required properly to cook the pizza.

10. The method of claim 9 wherein the assembled pizza is provided with a precooked shell further to reduce the cooking time required properly to cook the pizza.

11. The method of claim 9 or 10 wherein the assembled pizza is provided with a layer of cheese strips, each of said strips having a thickness in a range of about 1/16 inch to about 3/32 inch and comprising a cheese having a fat content on a dry basis between about 40% and about 50%.

12. The method of claim 9 or 10 wherein the assembled pizza is provided with a pre-heated tomato sauce having a temperature in excess of 145° F. and a dissolved tomato solids component in the range of about 10% to about 14%, and the cooking step is initiated before the sauce has cooled substantially in order further to reduce the cooking time required properly to cook the pizza.

13. A method for preparing and cooking pizza comprising the following steps:

providing a selected quantity of proofed pizza dough in a precook pan; then placing a lid on the precook pan to seal the internal volume defined by the precook pan and the lid to confine the dough such that the dough substantially fills the internal volume defined by the precook pan and the lid, thereby partially degassing the proofed dough, said lid shaped to form a raised circumferential rim on the upper surface of the pizza dough and to hold the dough in a shape adapted to facilitate pizza assembly;

precooking the confined dough to form a pizza shell while the dough is in the precook pan and is confined by the lid; then cooling the precooked shell;

removing the precooked and cooled shell from said precook pan;

placing the cooled, precooked shell in a cooking pan provided with a lower surface which defines a plurality of openings formed therein, said lower surface further defining a plurality of raised support regions which support at least a portion of the shell above the lower surface to reduce the area of contact between the shell and the lower surface;

applying a pre-heated tomato sauce having a temperature greater than about 145° F. and a dissolved tomato solids component greater than about 10% by weight to the shell, said temperature being sufficient to retard bacterial growth in said sauce but less than that which causes carmelization;

applying a layer of cheese strips over the tomato sauce, each of said strips having a thickness in a range of about 1/16 inch to about 3/32 inch and comprising a cheese having a fat content on a dry basis between about 40% and about 50% to complete the assembly of a pizza; and then cooking the assembled pizza in the cooking pan in a forced air oven which comprises means for directing heated air through said openings in the pan directly against the underside of the shell, and means for directing heated air against the upper surface of the assembled pizza to accelerate the cooking of the assembled pizza.

14. A method for precooking a pizza shell comprising the following steps:

providing a selected quantity of proofed pizza dough in a precook pan; then placing an imperforate lid on the precook pan to confine the dough such that the dough substantially fills the internal volume defined by the precook pan and the lid, thereby partially degassing the proofed dough, said lid shaped to form a raised circumferential rim on the upper surface of the pizza dough and to hold the dough in a shape adapted to facilitate pizza assembly; and then precooking the confined dough to form a pizza shell while the dough is in the precook pan and is confined by the lid, said lid acting to control moisture loss during cooking and to define the finished shape of the precooked pizza shell.

15. The method of claim 14 further comprising the step of adding a selected quantity of a cooking oil to the precook pan before the lid is placed on the precook pan, and further, wherein the cooking step is controlled such that the weight of the precooked pizza shell is substantially equal to the weight of the selected quantity of proofed dough, and the weight of the oil absorbed by the precooked pizza shell is substantially equal to the weight of the moisture lost by the proofed dough during the cooking step.

16. A method for preparing and cooking pizza comprising the following steps:

providing a pizza shell;

preheating a tomato sauce having a dissolved solids component greater than about 10% by weight to a temperature greater than about 145° F. in order to retard bacterial growth in said sauce but less than that which causes carmelization;

applying at least a portion of the preheated sauce to the shell to cover a major portion of the shell;

applying at least one additional food component over the portion of preheated sauce to complete assembly of a pizza, said at least one food component comprising a layer of cheese strips, each having a thickness in a range of about 1/16 inch to about 3/32 inch and a fat content on a dry basis between about 40% and about 50%;

placing the assembled pizza in a forced air, heated air oven in order to cook the assembled pizza, said oven comprising means for directing jets of heated air toward the top and bottom of the assembled pizza;

the heat of the preheated sauce, the shape and fat content of the cheese strips, and the forced air oven cooperating to reduce the cooking time required properly to cook the assembled pizza.

17. The method of claim 16 wherein the tomato sauce is preheated to a temperature in the range of about 145° F. to about 160° F.

18. The method of claim 16 wherein the sauce is preheated to a temperature of about 145° F.

19. The method of claim 16 wherein the step of providing the pizza shell comprises the following steps:

providing a selected quantity of proofed pizza dough in a pan; then placing an imperforate lid on the pan to confine the dough such that the dough substantially fills the internal volume defined by the pan and the lid, thereby partially degassing the proofed dough, said lid shaped to form a raised circumferential rim on the upper surface of the dough and to hold the dough in a shape adapted to facilitate pizza assembly; then removing the lid.

* * * * *

UNITED STATES PATENT AND TRADEMARK OFFICE
CERTIFICATE OF CORRECTION

PATENT NO. : 4,367,243
DATED : Jan. 4, 1983
INVENTOR(S) : Barry Brummett and Edward O'Neill It is certified that error appears in the above—identified patent and that said Letters Patent is hereby corrected as shown below:

In the title of the invention please insert --AND-- between "PREPARING" and "COOKING".
In column 5 line 57 please delete "chesse" and insert therefor --cheese--.

Signed and Sealed this

Thirtieth Day of August 1983

[SEAL]

Attest:

GERALD J. MOSSINGHOFF

Attesting Officer    Commissioner of Patents and Trademarks